United States Patent [19]

Dicks

[11] 3,904,554

[45] Sept. 9, 1975

[54] CATALYST OF RUTHENIUM AND ZINC OXIDE ON ALUMINA CARRIER FOR STEAM REFORMING HYDROCARBONS

[75] Inventor: Andrew Leslie Dicks, Solihull, England

[73] Assignee: British Gas Corporation, London, England

[22] Filed: Jan. 26, 1973

[21] Appl. No.: 327,229

[30] Foreign Application Priority Data
Jan. 27, 1972  United Kingdom................ 3889/72

[52] U.S. Cl............. 252/466 PT; 252/473; 48/213; 48/214
[51] Int. Cl.² ..................... B01J 23/62; B01J 23/60
[58] Field of Search......... 252/466 PT, 473; 48/213, 48/214

[56] References Cited
UNITED STATES PATENTS

| | | | |
|---|---|---|---|
| 2,728,713 | 12/1955 | Kearby et al................. | 252/466 PT |
| 2,942,960 | 6/1960 | Gerhold........................... | 48/214 X |
| 3,180,902 | 4/1965 | Andersen et al................. | 48/213 X |
| 3,271,325 | 9/1966 | Davies et al. ................. | 252/466 PT |
| 3,351,566 | 11/1967 | Taylor et al. ...................... | 252/452 |
| 3,444,099 | 5/1969 | Taylor et al. ...................... | 48/214 X |
| 3,476,508 | 11/1969 | Kearby et al. .................... | 423/213.5 |
| 3,481,722 | 12/1969 | Pfefferle ............................. | 48/214 |
| 3,655,747 | 4/1972 | Sennewald et al.............. | 252/473 X |
| 3,679,769 | 7/1972 | Kmecak et al. ................ | 252/466 PT |
| 3,784,675 | 1/1974 | Kobylinski et al............... | 423/213.5 |

FOREIGN PATENTS OR APPLICATIONS

| | | | |
|---|---|---|---|
| 803,261 | 10/1958 | United Kingdom........... | 252/466 PT |
| 163,198 | 2/1953 | Australia...................... | 252/466 PT |

Primary Examiner—W. J. Shine

[57] ABSTRACT

A catalyst composition is disclosed which consists essentially of (i) ruthenium or a compound thereof, (ii) zinc oxide or a zinc compound and (iii) a carrier. Preferably the composition consists essentially of (i) from 1 to 20 percent by weight ruthenium, (ii) from 30 to 50 percent by weight zinc oxide and (iii) from 65 to 35 percent by weight catalyst carrier, the percentages being percentages by weight of the total composition. The catalyst compositions of the present invention may be used in the synthesis of methane, and in the steam reforming or hydro-reforming of hydrocarbons.

4 Claims, No Drawings

CATALYST OF RUTHENIUM AND ZINC OXIDE ON ALUMINA CARRIER FOR STEAM REFORMING HYDROCARBONS

BACKGROUND OF THE INVENTION

A process for the low-temperature gasification of light hydrocarbons (for instance, light petroleum distillate or naptha) is described and claimed in our British Pat. Specification No. 820,257. The process comprises passing a mixture of predominantly paraffinic hydrocarbons and steam in vapour form at a temperature above 350°C through a bed of nickel catalyst under atmospheric or superatmospheric pressure such that the bed is maintained by the reaction at a temperature within the range 400° to 550°C.

One modification of the process of British Pat. Specification No. 820,257 is described and claimed in our British Pat. Specification No. 1,000,309. The process comprises reacting steam with the vapour of paraffinic hydrocarbons having an average of from 4 to 15 carbon atoms per molecule in a bed of nickel catalyst, the hydrocarbon vapour and steam being passed into the bed of catalyst at a temperature of from 350° to 600°C, under conditions such that the bed of catalyst is maintained at a temperature of from 400° to 550°C, except that when the paraffinic hydrocarbons have an average of from 4 to 10 carbon atoms per molecule, the hydrocarbon vapour and steam are passed into the bed of catalyst at a temperature of more than 500°C.

A second modification of the process of British Pat. Specification No. 820,257 is described and claimed in our British Pat. Specification No. 1,033,765. The process comprises passing a mixture of the vapour of paraffinic hydrocarbons having from 4 to 15 carbon atoms per molecule and steam at a temperature of at least 350°C into a bed of nickel catalyst, whereby the maximum temperature in the catalyst bed is maintained at from 550° to 600°C and substantially no carbon deposition takes place on the catalyst.

Furthermore, a process for the production of a gas consisting principally of methane from predominantly paraffinic hydrocarbons, or mixtures thereof, containing an average of from 2 to 5 carbon atoms per molecule is described and claimed in our British Pat. Specification No. 1,029,711. The process comprises passing a mixture of the hydrocarbons and steam through a bed of catalyst under atmospheric or superatmospheric pressure, the temperature of the bed of catalyst being below 400°C or preferably below 390°C, whereby reaction of the hydrocarbons and steam is effected to produce a methane-containing gas.

Also a process for the hydroreforming of a hydrocarbon feedstock is described and claimed in our British Pat. Specification No. 1,053,855. The process comprises passing a heated mixture of a hydrocarbon feedstock which is liquid at normal temperatures and pressures and boils below 300°C, from 0.1 to 2.5 lb. moles of hydrogen and at least 0.3 lb. moles of steam per pound atom of carbon in the feedstock, the mixture having a sulphur content of not more than 0.025 grains per 100 standard cu. ft. through a bed of highly activated particulate solid metal catalyst under such conditions that the mixture remote to produce substantially only products which are gaseous at standard temperature and pressure.

By the term "hydroreforming" as used herein is meant a steam-reforming process in which a gas comprising hydrogen is present in the reactant mixture together with steam and the hydrocarbons.

Our co-pending U.S. Pat. Application Ser. No. 278,068 filed Aug. 4 1972, and now abandoned, describes a process for the production of a gas consisting substantially wholly of methane and carbon dioxide by the catalytic gasification of light hydrocarbons with steam, which process comprises performing the gasification reaction under elevated pressure in the presence of a proportion of water in the liquid phase. The catalyst used in this process may comprise a metal of group 8 of the periodic table of the classification of the elements supported on a carrier such as alumina. A catalyst composition comprising 35 percent by weight ruthenium and 65 percent by weight alumina is described for use in the said process.

Our co-pending U.S. Pat. Application Ser. No. 286,827 filed Sept. 6, 1972, and now abandoned describes a process for the catalytic gasification of light hydrocarbons with steam wherein the gasification reaction is carried out at a given pressure or a given temperature, a part of the reaction being effected in the presence of water in liquid phase and a part of the reaction being effected with all the reactants in the gaseous phase.

PRIOR ART

A large number of patent specifications describe in general terms catalyst compositions for use in various processes which compositions comprise an alumina support having deposited thereon a metal or metal oxide of group VIII of the periodic classification of the elements. It has been suggested that other metals or metal oxides may additionally be employed in such compositions. For example, British Patent Specification No. 803,261 describes a process for the pressure hydrogenation of hydrocarbons in the presence of catalytically acting metals or metal compounds which are supported on alumina which has been prepared in a particularly described manner. The catalyst may be prepared by the impregnation of the said alumina support with a solution of one or more compounds of metals of the 5th to 8th groups of the periodic system, the heavy metals of the 1st group, such as copper, silver and gold, and/or zinc, magnesium, cadmium, zirconium, tin, lead, antimony and bismuth.

We have now surprisingly discovered that a very active catalyst, particularly suitable for use in the processes described in our British Pat. Specifications Nos. 820,257, 1,000,309, 1,033,765, 1,029,711 and 1,053,855 and in our U.S. Pat. Applications Ser. Nos. 278,068 and 286,827, is one which comprises certain combinations of ruthenium and zinc oxide.

The catalyst compositions of the present invention generally possess one or more of the following advantages when compared to other catalysts for the synthesis of methane and for the steam reforming and hydroreforming of hydrocarbons; greater freedom from deterioration in catalytic activity that results from the formation on its surface of submicroscopic deposits derived from constituents of the feedstock, with such decay as is observed being readily reversible, this cause of loss of activity being sometimes known as "polymer formation"; the possibility of gasifying heavier feedstocks, and feedstocks containing substantially higher proportions of aromatic hydrocarbons, then hitherto; the possibility of using a lower steam to hydrocarbon feedstock ratio with conventional feedstocks; and a degree of resistance to sulphur poisoning much in excess of that found with nickel catalysts.

SUMMARY OF THE INVENTION

Accordingly, the present invention provides a catalyst composition which consists essentially of (i) ruthenium, (ii) a zinc compound predominantly comprising zinc oxide and (iii) a carrier.

By the term "catalyst composition" as used herein is meant either a composition which is a catalyst precursor, i.e. which requires a pretreatment step to convert it into the catalytically active form, or a composition which is present in catalytically active form. The catalytically active form of the catalyst compositions of the present invention comprises ruthenium, zinc oxide and a carrier. The term catalyst is used herein only to apply to catalyst compositions which are in catalytically active form ready for direct use in a particular catalytic reaction.

PREFERRED EMBODIMENTS

It will be understood that the catalyst compositions of the present invention may contain ruthenium in the form of a compound thereof, which on pretreatment, such as reduction in hydrogen, will be converted to the metal per se. Similarly, the catalyst compositions may contain a zinc compound which on pretreatment will be converted to zinc oxide. For example, the oxides, hydroxides, carbonates, basic carbonates, or organic salts such as acetates, oxalates or lactates of the platinum metal and/or zinc may be used in the catalyst compositions of the invention.

The catalyst compositions of the present invention may be prepared by any suitable known method, for example by precipitation or co-precipitation.

A preferred catalyst for use in the synthesis of methane, and in the steam reforming or hydroreforming of hydrocarbons comprises ruthenium, zinc oxide and alumina. The catalyst composition, for use in such processes, as charged to a reactor generally comprises ruthenium, zinc and aluminium, in combination as oxides, hydroxides, carbonates, or basic carbonates. This composition may be prepared by co-precipitation, for example, by adding ammonium bicarbonate solution to a solution of water soluble aluminium, zinc and ruthenium salts, such as a solution containing aluminium nitrate, zinc acetate and ruthenium chloride. Care should be taken to add a carbonate precipitant slowly, so as to control the frothing which takes place due to the liberation of carbon dioxide. If desired, a hydrophilic antifoaming surfactant may be added to suppress foaming, for instance "Texofor D4" (Registered Trade Mark). The precipitate is washed by repeated reslurrying with water, or with an aqueous solution of ammonium bicarbonate, of which a suitable concentration is for example 2 percent by weight, and thereafter filtered, dried and pelleted. The catalyst composition is then charged to the reactor and reduced in situ to the catalytically active form which comprises a mixture of ruthenium, zinc oxide and alumina.

Other suitable salts and precipitants, including mixtures may of course be used. For example, the precipitant may be sodium or potassium hydroxide or carbonate, or mixtures thereof. When the hydroxide is used, dissolution of the precipitate of aluminium or zinc hydroxide in excess of the precipitant is avoided by discontinuing the addition when the pH of the liquid in which the precipitant is suspended reaches 8 to 9. There may be advantage in ensuring that the catalyst precursor passes through the carbonate or basic carbonate form in preparation, however transitorily, in order to obtain a catalyst of optimum performance. Using a hydroxide precipitant we have found that this advantage can be retained if, when precipitation is complete, the suspension is saturated with carbon dioxide at room temperature and pressure before the steps of filtration, washing and drying are effected. A convenient method of effecting this saturation is to introduce lumps of solid carbon dioxide into the warm suspension and to allow this to stand while cooling for 2 to 3 hours. When precipitation is effected with alternatives to ammonium bicarbonate, it remains efficacious to slurry and wash with dilute ammonium bicarbonate solution.

It may be found advantageous to anticipate the possibility of catalysts prepared according to the invention shrinking in use and so ceasing to fill the space in a reactor to which they are initially charged. The preferred treatment is to heat the catalysts in their pelleted form to about 400°C in air and to maintain them at that temperature for several hours; a period of 4 hours' heating has been found sufficient.

A particularly preferred catalyst for use in the aforementioned processes comprises from 1 to 20 percent by weight ruthenium, from 30 to 50 percent by weight zinc oxide, and from 65 to 35 percent by weight catalyst carrier, preferably alumina. The most particularly preferred range of ruthenium contents is from about 5 to about 10 per cent. About 5 per cent is quite sufficient for the gasification of light feedstocks of low boiling range; for heavier, higher-boiling feedstocks it may be advisable to use a higher proportion, up to say 10 per cent.

The catalyst may, alternatively, be prepared by mixing together an alkaline solution of a perruthenate, for instance, potassium perruthenate, with an aqueous solution of zinc and aluminium salts, when insoluble compounds of ruthenium, aluminium and zinc are co-precipitated.

The present invention also includes within its scope processes for the synthesis of methane, the steam reforming of hydrocarbons or the hydroreforming of hydrocarbons in which a catalyst composition which comprises (i) ruthenium or a compound thereof, (ii) zinc oxide or a zinc compound and (iii) a carrier is used.

In one particular aspect the present invention provides a process for the production of a gas consisting substantially wholly of methane and carbon dioxide by the catalytic gasification of light hydrocarbons with steam, which process comprises performing the gasification reaction in the presence of a catalyst according to the invention, under elevated pressure in the presence of a proportion of water in the liquid phase.

In another particular aspect the present invention provides a process for the production of a gas consisting substantially wholly of methane and carbon dioxide by the catalytic gasification of light hydrocarbons with steam, which process comprises performing the gasification reaction in the presence of a catalyst according to the invention at a given pressure or a given temperature, a part of the reaction being effected with all the reactants in the gaseous phase.

It has been found that with catalysts prepared according to the invention, particularly low steam/hydrocarbon ratios can be used in a process operated according to the immediately preceding paragraphs. Depending on the density and boiling range of the hydrocarbon feedstock, steam/feedstock ratios as low as 1.4 may be used without carbon deposition, loss of activity or incompleteness of gasification.

Furthermore, it has also been found that the catalyst is more resistant to poisoning by sulphur than are catalysts, usually containing nickel, which are generally used for steam-reforming and methanation processes. Whereas, for instance, the use of a nickel catalyst in a process operated according to our U.S. Pat. Applications Ser. Nos. 278,068 and 286,827 would require the hydrocarbon feedstock to contain less than 0.2 ppm by weight of sulphur, we have found that with a catalyst according to the present invention the feedstock may be allowed to contain up to 15 or even approaching 30 ppm of sulphur. It has furthermore been observed that poisoning resulting from gasifying feedstocks containing more than 30 ppm of sulphur can be reversed, the catalyst being regeneratable by steaming.

Other processes in which the catalyst compositions of the present invention may be used include the processes described in our British Pat. Specifications Nos. 820,257, 1,000,309, 1,033,765, 1,029,711 and 1,053,855.

The invention will be further illustrated by the following Examples.

EXAMPLE I (A) Preparation of Catalyst Composition 1104 g. of aluminium nitrate ($Al(NO_3)_3$, $9H_2O$), 403 g. of zinc acetate ($Zn(CH_3.CO_2)_2$, $2H_2O$) and 72.8 g. of ruthenium chloride ($RuCl_3$, x $H_2O$), containing 41.2 per cent ruthenium, were dissolved in 2 l of distilled water. The mixture was heated to 60°–70°C and a cold saturated solution of ammonium bicarbonate was added, with vigorous stirring, until the pH of the liquor reached 8. The precipitate was washed by repeated re-slurrying with water and filtering until the filtrate was sensibly free from chloride ions. It was dried overnight in air at 120°C and, with the addition of 2 per cent of graphite as a lubricant, was pelleted to ⅛ in. equant cylinders.

The material, before being pelleted, contained, by weight, the following percentages of the three metals, in various states of combination:

Ru 5.7  Zn 18.4  Al 17.6

On the assumption that when the catalyst composition is charged to a reactor and reduced in hydrogen at an elevated temperature, the ruthenium appears as metal and the zinc and aluminium as oxides, the composition of the working catalyst is, per cent by weight:

Ru 9.2  ZnO 37.0  $Al_2O_3$ 53.8

Catalysts of other compositions may be made in the same manner, starting with appropriate quantities of materials. The compositions of working catalysts that have been so prepared have been, per cent by weight:

| Ru | ZnO | $Al_2O_3$ |
| --- | --- | --- |
| 10.6 | 34.4 | 55.0 |
| 5.2 | 62.5 | 32.3 |
| 5.1 | 43.9 | 51.0 |
| 3.7 | 52.1 | 44.2 |
| 2.5 | 43.5 | 54.0 |
| 1.0 | 35.8 | 63.2 |

(B) Apparatus, Method of Operation and Results

The process described in our U.S. Pat. Applications Ser. Nos. 278,068 and 286,827 was carried out under the following conditions I. 255.9 g. of the pelleted catalyst composition was packed into a 0.75 in. diameter vertical stainless steel reactor tube which was 44 in. long to give a catalyst bed 36 in long. The catalyst rested on an inert packing of alpha-alumina particles, one-eighth to one-sixteenth in. in diameter, filling the lower 4 in. of the tube, and was surmounted by a 4 in. column of the same material to fill the tube. The apparatus was operated with downward flow of reactants.

The catalyst composition was reduced in hydrogen at 350°C and 1 atmosphere pressure. After reduction of the catalyst composition sulphur-free naphtha (LDF 115*) was gasified continuously for 1,030 hours under the following operating conditions:

| Pressure | 2400 p.s.i.g. |
| --- | --- |
| Steam/naphtha ratio | 1.25:1 by volume |
| | 1.84:1 by weight |
| Temperatures, °C | |
| Inlet | 304 – 318 |
| maximum | 340 – 366 |
| Outlet | 302 – 354. |

Throughput: varied as follows:

| Time Hours | Volume of reagent supplied per hour, ml. | |
| --- | --- | --- |
| | Naphtha | Water |
| First 511 | 96 | 120 |
| next 138 | 120 | 150 |
| next 46 | 144 | 180 |
| next 145 | 168 | 210 |
| next 143 | 192 | 240 |
| next 67 | 96 | 120 |
| 1030 | | |

The supply of 96 ml. per hour of naphtha corresponds to a throughput of 47.0 lb. of naphtha per hour per square foot cross-section catalyst column.

Temperatures, and the position of the maximum temperature in the catalyst column, varied according to the throughput, but the stability of the performance of the catalyst was demonstrated by reverting to the initial throughput during the last 67 hours as indicated above, when the temperature conditions reverted to their original values.

The product gas composition, per cent by volume, varied little from the following, which corresponds to an outlet temperature of 342°C:

| | dry | dry, after carbon dioxide removal to 1 percent |
| --- | --- | --- |
| carbon dioxide | 22.3 | 1.0 |
| methane | 76.3 | 97.2 |
| hydrogen | 1.4 | 1.8 |

II. The catalyst used in Experiment (1) was then used, without being discharged or pretreated in any way, for the gasification of sulphur-free naphtha (LDF 170*) under the same operating conditions, with throughputs of 96 ml. per hour, of naphtha and 120 ml./hour of water (steam/distillate ratio 1.733:1 by weight) for 287 hours, during which time the temperature distribution, °C, was

|  |  |
|---|---|
| Inlet | 320–335 |
| Maximum | 365–375 |
| Outlet | 318–328 |

The product gas composition, per cent by volume at an outlet temperature of 325°C was

|  | dry | dry, after carbon dioxide removal to 1 per cent |
|---|---|---|
| carbon dioxide | 24.0 | 1.0 |
| methane | 75.5 | 98.3 |
| hydrogen | 0.5 | 0.7 |

FOOTNOTE* This designation refers to the result of applying method NO. I.P. 123/64, Institute of Petroleum, "Standard Methods of Test for the Distillation of Petroleum Products", to samples of the light petroleum distillates. The method is a standard side-arm distillation and the temperature of the vapour is measured immediately before it enters the side-arm to reach the condenser. When a light petroleum distillate designated L.D.F. T°C, is submitted to this test, not less than 95% by volume of the initial distillate shall have been condensed and collected in the receiver when the temperature at the inlet to the side-arm has reached T°C. T°C is generally a few degrees C lower than the final boiling-point as observed in the same test.

No sign of catalyst deterioration was observed. In all the experiments described in this specification conditions of complete gasification were observed unless otherwise stated.

EXAMPLE 2

The catalyst from Example I(B)(II) was used without being discharged or pretreated, for the gasification of a variety of liquid hydrocarbons and mixtures thereof, at a pressure of 2,400 p.s.i.g.

The details of the experimental working conditions are given in Table 1. In this and subsequent Examples, the hydrocarbon feedstock was sulphur-free unless otherwise stated.

TABLE I

| Period | Hours after the experiment of Example I, (B)(II) | Feedstock | Hydrocarbon feed rate ml/hr. | Steam/hydrocarbon ratio, by weight |
|---|---|---|---|---|
| A | 24 | LDF 170 and cyclohexane, 1:1 by volume | 96 | 1.67 |
| B | next 168 | cyclohexane | 96 | 1.60 |
| C | next 47 | benzene and cyclohexane mixture, 1:3 by volume | 72 | 2.08 |
| D | next 72 | benzene and cyclohexane, 1:1 by volume | 72 | 2.02 |
| E | next 151 | benzene | 66 | 1.91 |
| F | next 143 | xylene and benzene mixture, 3:7 by volume | 66 | 1.90 |
| G | next 148 | LDF 170 | 96 | 1.73 |
| H | next 72 | Kerosene* | 66 | 2.30 |
| I | next 24 | LDF 170 | 96 | 1.73 |
| J | next 96 | Kerosene* | 66 | 2.30 |
| K | next 65 | LDF 170 | 96 | 1.73 |
| L | next 79 | Kerosene/LDF 170 (1:3 by volume) | 96 | 1.75 |
| M | next 70 | LDF 170 | 96 | 1.73. |

*After about 24 hours, in each experiment with kerosene, traces of ungasified feedstock were noticed appearing at the reactor outlet, and this slip increased in quantity. When the feedstock was changed back to LDF 170, conditions of complete gasification were immediately restored. The catalyst therefore suffered no permanent deactivation when treating kerosene. There was no slip in the experiment in which kerosene mixed with LDF 170 was gasified.

The temperature distributions observed in these experiments and the typical methane contents of the product gases (per cent by volume) are given in Table 2.

TABLE 2

| Period | Temperature, °C | | | Methane content of product gases | |
|---|---|---|---|---|---|
|  | Inlet | Maximum | Outlet | Dry | Dry, after carbon dioxide removal to 1 per cent |
| A | 315 | 369 | 330 | 74.4 | 98.2 |
| B | 320 | 373 | 327 | 75.5 | 98.3 |
| C | 320 | 387 | 320 | 73.4 | 97.9 |
| D | 310 | 377 | 320 | 72.9 | 98.0 |
| E | 302 | 392 | 328 | 75.6 | 98.3 |
| F | 315 | 369 | 342 | 74.4 | 98.2 |
| G | 316 | 373 | 335 | 76.0 | 97.9 |
| H | 335 | 352 | 333 | 74.2 | 92.3 |
| I | 335 | 361 | 337 | 76.7 | 98.8 |
| J | 344 | 355 | 341 | 74.1 | 94.2 |
| K | 317 | 380 | 330 | 76.3 | 97.9 |
| L | 337 | 384 | 331 | 76.3 | 98.0 |
| M | 335 | 375 | 335 | not analysed | |

EXAMPLE 3

A. Preparation of catalyst

One thousand one-hundred four g. of aluminium nitrate $(Al(NO_3)_3, 9H_2)$, 403 g. of zinc acetate $(Zn(CH_3.CO_2)_2, 2H_2O)$ and 79.7 g. of ruthenium trichloride $(RuCl_3, xH_2O)$ containing 37.6 per cent of ruthenium, were dissolved in two litres of distilled water. The mixture was heated to 60 to 70°C and a cold saturated solution of ammonium bicarbonate was added, with vigorous stirring, until the pH of the liquor reached 8. Texafor D4 anti-foaming agent was added dropwise during the precipitation. The precipitate was washed, dried and pelleted as in Example 1.

The composition of the working catalyst on the same basis as in Example 1 was

| Ru | 9.8 | ZnO | 39.5 | $Al_2O_3$ | 50.7. |
|---|---|---|---|---|---|

B. Apparatus, Method of Operation and Results

The apparatus used was the same as that described in Example 1 (B), but the catalyst packing weighed 216.8 g. as charged and occupied a column 29.5 in. long. This was supported on and surmounted by alumina particles, as before.

The packing was used, after reduction, for an experiment exactly as in Example 2, at a pressure of 2,400 p.s.i.g., for the gasification of a wide variety of liquid hydrocarbons and mixtures thereof, as detailed in Table 3.

Table 3

| Period | Duration (hours) | Feedstock | Hydrocarbon feed rate (ml/h) | Steam/hydrocarbon ratio, by weight |
|---|---|---|---|---|
| A | 369 | LDF 115 | 96 | 1.84 |
| B | next 283 | LDF 170 | 96 | 1.733 |
| C | next 53½ | LDF 170 and cyclohexane, 1:1 by volume | 96 | 1.67 |

Table 3-Continued

| Period | Duration (hours) | Feedstock | Hydrocarbon feed rate (ml/h) | Steam/hydrocarbon ratio, by weight |
|---|---|---|---|---|
| D | next 168 | cyclohexane | 96 | 1.60 |
| E | next 48 | benzene and cyclohexane mixture, 1:3 by volume | 72 | 2.08 |
| F | next 234 | benzene and cyclohexane mixture, 1:1 by volume | 72 | 2.03 |
| G | next 241½ | benzene | 66 | 1.91 |
| H | next 150 | xylene and benzene mixture, 3:10 by volume | 66 | 1.90 |
| I | next 220 | xylene and benzene mixture, 1:1 by volume | 66 | 2.08 |
| J | next 94 | LDF 170 | 96 | 1.733 |
| K | next 556¾ | LDF 170 | —** | —** |
| L | next 175 | Natural gas condensate*** | 90 | 1.764 |
| M | next 96 | LDF 170 | 96 | 1.733 |

**During this period the throughput of both the steam and hydrocarbon were increased (see Table 5 below)

***Natural gas condensate is a liquid mixture of hydrocarbons obtained when natural gas is prepared for transmission and distribution to customers. The sample used had the following properties:

| | |
|---|---|
| Specific gravity 60°/60°F | 0.756 |
| Initial Boiling point | 65°C |
| Final Boiling point | 205°C |
| Hydrocarbon Type Analysis: per cent by volume: | |
| Olefins | — |
| Aromatics | 13.8 |
| Paraffins | 86.2 |

The temperature distributions observed in these experiments and the typical methane contents of the product gases (per cent by volume) are given (except for Period K) in Table 4.

Table 4

| Period | Temperature °C | | | Methane content of product gases | |
|---|---|---|---|---|---|
| | Inlet | Maximum | Outlet | Dry | Dry, after dioxide removed to 1 per cent |
| A | 337 | 369 | 365 | 78.2 | 97.0 |
| B | 333 | 371 | 369 | 78.4 | 97.7 |
| C | 332 | 379 | 375 | 74.4 | 97.5 |
| D | 329 | 380 | 375 | 75.5 | 97.4 |
| E | 333 | 372 | 369 | 74.4 | 97.6 |
| F | 330 | 378 | 373 | 74.4 | 97.6 |
| G | 313 | 384 | 376 | 68.1 | 97.7 |
| H | 333 | 389 | 375 | 70.8 | 97.7 |
| I | 327 | 387 | 387 | 66.0 | 96.8 |
| J | 332 | 374 | 374 | 79.8 | 96.3 |
| L | 333 | 373 | 373 | 75.3 | 97.2 |
| M | 326 | 366 | 366 | 77.4 | 97.2 |

Table 5

| Duration | Hydrocarbon feed rate ml/hour | Temperature °C | | |
|---|---|---|---|---|
| | | Inlet | Maximum | Outlet |
| 222¾ | 120 | 341 | 375 | 374 |
| next 92 | 144 | 341 | 368 | 368 |
| next 22 | 144** | 344 | 388 | 383 |
| next 50 | 144 | 343 | 377 | 377 |
| next 74 | 168 | 344 | 369 | 369 |
| next 30 | 192 | 344 | 365 | 365 |
| next 66 | 96 | 330 | 364 | 364 |

**The steam/hydrocarbon ratio was 1.62 by weight in all periods of this experiment except for this one when it was 1.73.

The 556¾ hours of Period K in Tables 3 and 4 were taken up with a continuous experiment with LDF 170 at a substantially increased throughput. Details are given in Table 5.

The gas compositions obtained are not tabulated; they were generally as already stated for the gasification of LDF 170.

EXAMPLE 4

This Example illustrates the preparation of catalysts containing approximately 5 per cent of ruthenium, by various means, and their use for gasification of a light hydrocarbon feedstock under conditions similar to those of Examples 1 to 3.

Catalyst A was prepared as already described in Example 1, and the composition of the working catalyst was Ru 5.2;   ZnO 62.5;   Al$_2$O$_3$ 32.3.

Catalyst B was made by co-precipitation, using sodium hydroxide solution (363 g. per litre) as precipitant. The precipitant was added to the warm solution of appropriate quantities of zinc and aluminium nitrates and ruthenium trichloride, until the pH reached 8.7, the temperature being maintained at 65° to 70°C. The precipitate was filtered and washed by slurrying with distilled water, dried and pelleted. The working composition was Ru 5.0;   ZnO 46.7;   $Al_2O_3$ 48.3.

Catalyst C was prepared in the same manner as Catalyst B, except that the warm suspension of precipitate was carbonated by introducing lumps of solid carbon dioxide, allowing to cool, and standing the slurry for 3 hours before the preparation was completed. The working composition was Ru 5.3;   ZnO 48.2   $Al_2O_3$ 46.5.

Catalyst D was made by precipitating a mixture of aluminium and zinc hydroxides and basic carbonates from warm solutions with sodium carbonate (final pH 7.8), separating the precipitate, suspending it in water and adding ruthenium chloride solution. After the suspension had stood for 30 mins., sufficient sodium carbonate solution (974 g/l. of sodium carbonate decahydrate) was added to raise the pH from 6.2 to 8.2. The precipitate was filtered and washed by reslurrying, first with 2 per cent ammonium bicarbonate solution, and then with water.

Each catalyst was tested in an apparatus generally as described in Example 1 (B) except that the reactor was 0.59 in. internal diameter and accommodated a catalyst column 25 in. long, supported and surmounted by alumina particles. The pressure was 2,400 p.s.i.g., the feedstock LDF 115 and the steam/feedsotck ratio 1.84 by weight. The rate of supply was such as to correspond to a throughput of 76 lb/h/ft$^2$ cross-section of catalyst. With each catalyst, complete gasification was observed for several hours, stable conditions being established. The temperatures, and a typical gas composition, were as given in Table 6.

Table 6

| Catalyst | Temperature, °C, observed in the catalyst beds: | | |
|---|---|---|---|
| | Inlet | Maximum | Outlet |
| A | 334 | 363 | 315 |
| B | 324 | 340 | 339 |
| C | 328 | 357 | 319 |
| D | 327 | 357 | 327 |

The composition, per cent by volume, of the dry gas obtained with catalyst A was:

$CH_4$, 78.0;   $CO_2$, 21.1;   $H_2$ 0.9;   CO, 0.0.

EXAMPLE 5

This Example illustrates the preparation and use of catalysts made from potassium perruthenate.

A. Catalyst Preparation

Two solutions were made. The first was of 91 g, zinc acetate and 183.9 g. aluminium nitrate, in the form of hydrated crystals, in two litres of distilled water. The second was prepared from a cooled solution of 81.3 g. sodium hydroxide in 350 ml. distilled water by dissolving in it 10.2 g. of potassium perruthenate $KRuO_4$. The first solution was warmed to 75°C and the second added to it with vigorous stirring. The precipitate was washed with warm distilled water, dried and pelleted. The composition of the working catalyst was:

Ru 3.7;   ZnO 44.6;   $Al_2O_3$ 51.7.

The catalyst was tested, as described in Example 4, with a catalyst bed 25 in. long and 0.59 internal diameter, but with a rate of supply of feedstock corresponding to a throughput of 57 lb/h/ft$^3$ cross-section of catalyst. The temperatures (°C) established were:

Inlet, 328;   Maximum, 354;   Outlet, 349, and the composition, per cent by volume, of the dry gas obtained was:

$CH_4$ 78.0; $CO_2$ 21.1; $H_2$ 0.9; CO 0.0.

Complete gasification was observed for several hours, stable conditions being established.

EXAMPLE 6

This Example illustrates the possibility of using catalyst according to the invention for the gasification of hydrocarbon distillate oils according to one aspect of the process described in our U.S. Pat. Applications Ser. Nos. 278,068 and 286,827, with particularly low steam/hydrocarbon ratios.

A catalyst was prepared as hereinbefore described, by co-precipitation from aluminium and zinc nitrates and ruthenium trichloride in aqueous solution, using sodium carbonate as precipitant. The precipitate was washed by slurrying first with 2 per cent ammonium bicarbonate solution and then with water. The composition of the working catalyst was:

Ru 8.4;   ZnO 50.4;   $Al_2O_3$ 41.2.

Sufficient of this catalyst was charged into the reactor of Example 1 (B) to give a column 39.4 in. long. The catalyst was supported on and surmounted by a packing of alumina particles After reduction, the catalyst was used for gasification of LDF 115 and LDF 170 at 2,400 p.s.i.g. Details of operating conditions and results obtained are given in Tables 7 and 8.

Table 7

| Period | Duration (hours) | Feedstock | Hydrocarbon Feed Rate, ml/h | Steam/hydrocarbon ratio by weight |
|---|---|---|---|---|
| A | 72 | LDF 115 | 96 | 1.84 |
| B | next 144 | LDF 115 | 96 | 1.65 |
| C | next 24 | LDF 115 | 108 | 1.47 |
| D | next 100 | LDF 115 | 120 | 1.47 |
| E | next 184 | LDF 170 | 96 | 1.74 |
| F | next 48 | LDF 170 | 108 | 1.54 |

Table 8

| Period | Temperature, °C | | Outlet Gas Composition, dry, per cent by vol. | | | |
|---|---|---|---|---|---|---|
| | Inlet | Maximum | $CO_2$ | CO | $H_2$ | $CH_4$ |
| A | 347 | 395 | 20.2 | 0.0 | 1.7 | 78.1 |
| B | 356 | 412 | 20.9 | 0.0 | 1.9 | 77.2 |
| C | 355 | 421 | not determined | | | |
| D | 355 | 420 | 20.9 | 0.0 | 1.3 | 77.8 |
| E | 344 | 410 | 22.4 | 0.0 | 1.6 | 76.0 |
| F | 344 | 420 | not determined. | | | |

EXAMPLE 7

This Example illustrates the resistance which a catalyst prepared according to the invention can offer to poisoning by sulphur.

At the end of the experiment described in Example 3 the catalyst, without being discharged or pretreated in any way, was used in a similarly-conducted experiment at 2,400 p.s.i.g. for the gasification in steam of LDF 170 containing increasing proportions of sulphur in the form of organic sulphur compounds. Conditions and results are detailed in Table 9.

Table 9

| Hours after end of the experiment of Example 3 | Sulphur content of feedstock p.p.m. by wt. | Degree of gasification observed |
|---|---|---|
| 143½ | 3.2 | Complete |
| next 279 | 8.0 | Complete |
| next 206 | 16.9 | Complete |
| next 70 | 31.5 | Incomplete. |

Such poisoning by sulphur as occurred with LDF 170 containing more than 30 p.p.m. of sulphur by weight was removed by passing steam over the catalyst for 3 hours at 2,400 p.s.i.g. The catalyst was then as capable of completely gasifying sulphur-free LDF 170 as it was before sulphur-containing feedstock was supplied.

EXAMPLE 8

A catalyst composition prepared according to the method described in Example 1 (A), in the form of 1/8 in. equant cylinders, was packed in a 0.175 in. internal diameter tube to form a column 33 in. in length.

The catalyst composition was reduced in hydrogen for 4 hours at 450°C and used, in the following series of experiments, each of which lasted between 24 and 48 hours.

1. Standard Steam Reforming Process Conditions

The process described in our British Patent Specification No. 820,257 was carried out under the following experimental conditions:

| | |
|---|---|
| Pressure | 450 p.s.i.g. |
| Inlet temperature | 450°C |
| Naphtha feedstock | LDF 170 |
| Steam/feedstock ratio | 1.60 by weight |
| Rate of supply of feedstock | 1025 lb/hr sq. ft. of catalyst cross-section. |

| Product gas composition per cent by volume | dry | dry with $CO_2$ removal to 1 per cent |
|---|---|---|
| CO | 0.1 | 0.1 |
| $CO_2$ | 22.25 | 1.0 |
| $CH_4$ | 66.95 | 85.3 |
| $H_2$ | 10.7 | 13.6 |

II. Low-temperature Steam Reforming Process Conditions

| | |
|---|---|
| Pressure | 450 p.s.i.g. |
| Inlet temperature | 360°C |
| Naphtha feedstock | LDF 170 |
| Steam/feedstock ratio | 1.60 by weight |
| Rate of supply of feedstock | 1025 lb/hr sq.ft. of catalyst cross-section. |

| Product gas composition, per cent by volume | dry | dry, with $CO_2$ removal to 1 per cent |
|---|---|---|
| CO | 0.0 | 0.0 |
| $CO_2$ | 22.7 | 1.0 |
| $CH_4$ | 72.5 | 92.8 |
| $H_2$ | 4.8 | 6.2 |

III. Hydroreforming Conditions

The process described in our British Patent Specification No. 1,053,855 was carried out under the following experimental conditions:

| | |
|---|---|
| Pressure | 450 p.s.i.g. |
| Inlet temperature | 360°C |
| Naphtha feedstock | LDF 170 |
| Steam/feedstock ratio** | 1.39 by weight |
| Hydrogen supply rate** | 3.68 s.c.f/lb of naphtha |
| Rate of supply of feedstock | 1025 lb/hr sq.ft. of catalyst cross-section. |

| Product gas composition** per cent by volume | dry | dry with $CO_2$ removal to 1 per cent |
|---|---|---|
| CO | 0.0 | 0.0 |
| $CO_2$ | 18.0 | 1.0 |
| $CH_4$ | 72.7 | 87.7 |
| $H_2$ | 9.3 | 11.3 |

FOOTNOTE **Nitrogen was added to the hydrogen to assist control of the low flow rate used in the laboratory experiments. The gas composition is reported on the nitrogen-free basis.

EXAMPLE 9

A catalyst composition prepared according to the method of Example 1(A), having the nominal working composition

| Ru | 9.2 | ZnO | 37.0 | $Al_2O_3$ | 53.8 | was packed into a 0.175 in. internal diameter reaction tube to form a column 33 in. long. After reduction it was used to operate the process according to our British Pat. Specification No. 820,257 in experiments which each lasted between 24 and 48 hours.

Pressure 450 p.s.i.g.

a. Inlet temperature 450°C

| | |
|---|---|
| Feedstock | xylene/LDF 170 mixture (20/80 by volume) |
| Steam/feedstock ratio | 1.58 by weight |
| Rate of supply of feedstock | 988 lb/hr sq.ft. of catalyst cross-section. |

| Product gas composition % by volume | dry | dry with $CO_2$ removal to 1 per cent |
|---|---|---|
| CO | 0.1 | 0.1 |
| $CO_2$ | 25.3 | 1.0 |
| $CH_4$ | 67.6 | 89.6 |
| $H_2$ | 7.0 | 9.3 | b. As above, but:

| | |
|---|---|
| Feedstock | Xylene (LDF 170 mixture (30/70 by volume)) |
| Steam/feedstock ratio | 1.65 by weight |

-Continued

| | |
|---|---|
| Rate of supply of feedstock | 965 lb/h/sq.ft. of catalyst cross-section. |

The product gas had a similar composition to that obtained in (a).

EXAMPLE 10

A sample of pelleted catalyst of composition in the working condition,

Ru, 9.2; ZnO, 37.0 $Al_2O_3$, 53.8 was heated in air, in the unreduced state, for 4 hours at 400°C to destroy any tendency it might have to shrink. It was then packed into apparatus as described in Examples 8 and 9 and used after reduction to operate the process according to our British Pat. Specification No. 820,257 as follows:

| | |
|---|---|
| Pressure | 450 p.s.i.g. |
| Inlet temperature | 450°C |
| Feedstock | LDF 170 |
| Steam/Feedstock ratio | 1.60 by weight |
| Rate of supply of feedstock | 1025 lb/h sq.ft. of catalyst cross-section |
| Duration of experiment | 750 hours. |

Complete gasification of the feedstock was observed throughout the test.

EXAMPLE 11

A catalyst composition prepared according to the method described in Example 1(A), in the form of ⅛ in. equant cylinders, was packed into a 0.50 in. internal diameter tube to form a column 4 in. long.

The catalyst composition was reduced in hydrogen for 65 hours at 350°C.

The methane enrichment of a gas, containing ethane and small concentrations of carbon oxides was carried out under the following experimental conditions:

| | |
|---|---|
| Pressure | 420 p.s.i.g. |
| Inlet temperature | 340°C |
| Space velocity, dry inlet gas | 6000 per hour |

| Inlet and product gas compositions, dry, per cent by volume | inlet | product |
|---|---|---|
| CO | 0.9 | 0.0 |
| $CO_2$ | 1.9 | 0.5 |
| $CH_4$ | 56.5 | 83.4 |
| $H_2$ | 29.6 | 11.3 |
| $C_2H_6$ | 11.1 | 4.8 |

I claim:

1. A catalyst composition for steam reforming hydrocarbons to produce gases containing a major proportion of methane, said composition comprising (i) from 1 to 20% by weight of the total composition of ruthenium, (ii) from 30 to 50% by weight of the total composition of zinc oxide and (iii) from 65 to 35% by weight of the total composition of alumina carrier, said catalyst being prepared by coprecipitation from a solution of water soluble salts of ruthenium, zinc and aluminium.

2. A composition as claimed in claim 1 wherein the ruthenium content is from 5 to 10% by weight of the total composition.

3. A process for the preparation of a composition as claimed in claim 1 which consists essentially of adding a precipitant selected from the group consisting of sodium hydroxide, potassium hydroxide, sodium carbonate, potassium carbonate and mixtures thereof to a solution of water soluble aluminium, zinc and ruthenium salts.

4. A process for the preparation of a composition as claimed in claim 1 which process consists essentially of mixing an alkaline solution of a perruthenate with an aqueous solution of zinc and aluminium salts, thereby co-precipitating said ruthenium, alumina and zinc oxide.

* * * * *